Aug. 14, 1923.
F. L. SMITH
1,464,731
SPOON HOLDER
Filed March 26, 1921
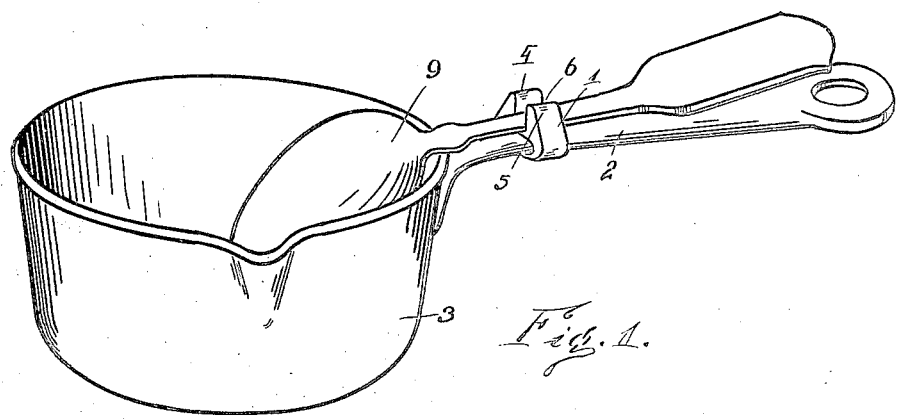
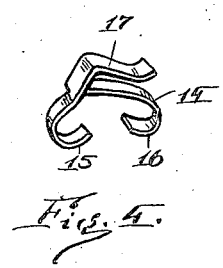
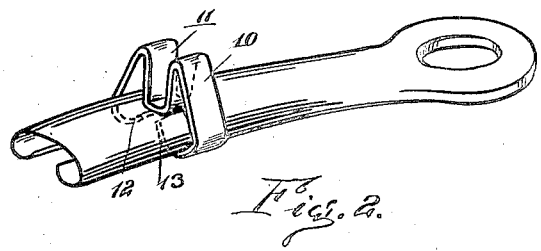
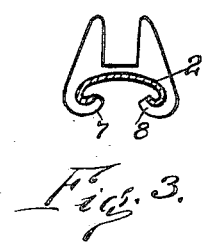
FREDERIC LEVI SMITH, Inventor
By Franz Keifer, Attorney Patented Aug. 14, 1923.

1,464,731

UNITED STATES PATENT OFFICE.

FREDERIC LEVI SMITH, OF PITTSFORD, NEW YORK; MARGARET CHRISTY SMITH ADMINISTRATRIX OF SAID FREDERIC LEVI SMITH, DECEASED, ASSIGNOR TO MARGARET CHRISTY SMITH, OF NORTHAMPTON, MASSACHUSETTS.

SPOON HOLDER.

Application filed March 26, 1921. Serial No. 455,893.

*To all whom it may concern:*

Be it known that I, FREDERIC LEVI SMITH, a citizen of the United States, residing at Pittsford, in the county of Monroe and State of New York, have invented certain new and useful Improvements in Spoon Holders, of which the following is a specification.

The object of this invention is to provide a new and improved form of spoon holder, one that can be readily attached to the handle of a pan so that the handle of a spoon can engage therein and be held in place on top of the handle of the pan.

In the accompanying drawing:

Fig. 1 is a perspective view of a pan with the spoon holder provided on the handle of the pan holding a spoon in place on top thereof.

Fig. 2 is a detail perspective view of the handle of a pan with a modified form of spoon holder attached thereto.

Fig. 3 is a cross section of the handle of the pan with the spoon holder attached thereto.

Fig. 4 is a detail perspective view of a modified form of spoon holder.

In the several figures of the drawing, like reference numerals indicate like parts.

The spoon holder comprising this invention, is made up of a bifurcated bracket 1 that is adapted to be slipped over the handle 2 of the pan 3. For this purpose, the bracket 1 is provided with two upwardly projecting lugs 4 and 5, which form the slot 6 between them. The bifurcation of the bracket is formed at the top thereof and at the under side. The bracket has a pair of prongs 7 and 8 formed thereon, which are adapted to engage the under side of the handle 2 to hold the bracket in place thereon. The bracket 1 is slipped over the handle with the prongs 7 and 8 engaging the under side thereof to a point on the handle near the pan, as illustrated in Figure 1. The handle of the spoon 9 can then be placed into the bifurcation of the bracket in such a manner that the bowl of the spoon will drain back into the pan while the bracket prevents the handle of the spoon from sliding off from the top of the handle. The spoon is thus held in readiness for instant use at all times and no time is lost in search for the spoon that would otherwise have to be laid aside of the pan and in some cases at a point remote from the position of the pan.

The bracket shown in place on the handle illustrated in Fig. 2 is made up of sheet metal and forms a spring clip. This clip 10 is bent to form the depression or channel 11 at the top of the handle and the pair of prongs 12 and 13 at the under side of the handle. These prongs are adapted to be sprung apart and then slipped over the handle and allowed to snap in place on the under side of the handle. The function of the spoon holder made up in the manner illustrated in Fig. 2 is the same as that of the holder illustrated in Fig. 1, as described above.

In Fig. 4 is illustrated another modified form of the spoon holder. This holder 14 is formed by a bracket bent up of sheet metal as is the holder shown in connection with Fig. 2. The prongs 15 and 16 of this bracket are the same as the prongs of the bracket 10 and the function thereof is identical. However, instead of having a channel formed at the top of the bracket as is the case with the bracket 10, a spring finger 17 is struck up at the top of the bracket 14. This spring finger projects laterally over a portion of the top of the bracket and forms a horizontal channel therewith. The handle of the spoon is adapted to engage under the spring finger 17 by forcing the handle sideways into the channel formed by the finger 17. The forward end of the finger 17 is curved downwardly and is adapted to yieldingly force down upon the handle of the spoon as it is inserted below it and will snap in place behind the handle and prevent its removal except when slight pressure is applied to the handle to force the handle from under the finger 17.

I claim:

1. A spoon holder, comprising a bracket, a pair of prongs formed at the bottom of said bracket, one at each side thereof, and extending inwardly and upwardly therefrom, said prongs being adapted to embrace the handle of a pan on the under side, a pair of lugs at the top of said bracket, the outer side of each of said lugs being inclined outwardly from the center of said bracket around the handle and the inner side of each of said lugs being vertical and forming a bifurcation between them, said holder being adapted to hold the handle of the spoon in line with the handle of the pan to which it is attached.

2. A spoon holder, comprising a bracket, a pair of prongs formed at the bottom of said bracket, one at each side thereof, and extending inwardly and upwardly therefrom, said prongs being adapted to embrace the handle of a pan on the under side, a pair of lugs at the top of said bracket, the outer side of each of said lugs being inclined outwardly from the center of said bracket around the handle and the inner side of each of said lugs being vertical and forming a bifurcation between them, said holder being formed of a single piece of sheet metal bent to the form described, said holder being adapted to hold the handle of the spoon in line with the handle of the pan to which it is attached.

In testimony whereof I affix my signature.

FREDERIC LEVI SMITH.